US011938915B2

(12) United States Patent
Subramanian et al.

(10) Patent No.: US 11,938,915 B2
(45) Date of Patent: Mar. 26, 2024

(54) BRAKING ARRANGEMENT FOR A VEHICLE

(71) Applicant: VOLVO TRUCK CORPORATION, Gothenburg (SE)

(72) Inventors: Chidambaram Subramanian, Greensboro, NC (US); Abram Mcconnell Bradley, IV, Colfax, NC (US)

(73) Assignee: Volvo Truck Corporat on, Gothenburg (SE)

( * ) Notice: Subject to any disclaimer, the term of this patent is extended or adjusted under 35 U.S.C. 154(b) by 565 days.

(21) Appl. No.: 17/249,884

(22) Filed: Mar. 17, 2021

(65) Prior Publication Data
US 2022/0297651 A1 Sep. 22, 2022

(51) Int. Cl.
*B60T 8/88* (2006.01)
*B60T 8/40* (2006.01)
*B60T 13/26* (2006.01)
*B60T 13/68* (2006.01)
*B60T 15/02* (2006.01)
*B60T 17/02* (2006.01)

(52) U.S. Cl.
CPC ............ *B60T 8/885* (2013.01); *B60T 8/4036* (2013.01); *B60T 8/4095* (2013.01); *B60T 13/26* (2013.01); *B60T 13/683* (2013.01); *B60T 15/027* (2013.01); *B60T 17/02* (2013.01); *B60T 2270/10* (2013.01); *B60T 2270/402* (2013.01)

(58) Field of Classification Search
CPC ........ B60T 8/342; B60T 8/885; B60T 8/1761; B60T 8/4036; B60T 8/4095; B60T 13/26; B60T 13/268; B60T 13/36; B60T 13/683; B60T 15/027; B60T 17/02; B60T 17/04; B60T 2270/10; B60T 2270/402
See application file for complete search history.

(56) References Cited

U.S. PATENT DOCUMENTS 2,423,057 A * 6/1947 Thomas .................... B60T 8/74
73/507
3,006,694 A * 10/1961 Valentine .............. B60T 8/1843
303/22.5

(Continued)

FOREIGN PATENT DOCUMENTS

EP 0765790 A2 4/1997
GB 447118 A * 11/1934
KR 100921277 B1 * 10/2009

OTHER PUBLICATIONS

Service Data, Bendix BP-R1 Bobtail Proportioning Relay Valve (2009).

(Continued)

*Primary Examiner* — John M Zaleskas
(74) *Attorney, Agent, or Firm* — WRB-IP LLP

(57) ABSTRACT

A braking arrangement for a vehicle includes a source of compressed air, a drive axle for the vehicle, a brake associated with the drive axle and connected to the source of compressed air by an air line, an operator controlled valve in the air line between the source of compressed air and the brake, a proportioning valve in the air line between the operator controlled valve and the brake. A compressor is driven by the drive axle or a drive shaft of the vehicle and has an outlet connected to a control port of the proportioning valve.

18 Claims, 3 Drawing Sheets

(56) References Cited

U.S. PATENT DOCUMENTS

| | | | | |
|---|---|---|---|---|
| 3,021,181 | A | * | 2/1962 | Fitch .................... B60T 8/36 303/177 |
| 3,312,509 | A | * | 4/1967 | Highley .............. B60T 8/4241 303/115.3 |
| 3,707,312 | A | * | 12/1972 | Drutchas ............. B60T 8/4095 303/116.3 |
| 3,740,104 | A | * | 6/1973 | Wolf .................... B60T 8/4095 303/116.3 |
| 3,997,889 | A | * | 12/1976 | Sato ..................... B60T 8/885 340/453 |
| 4,169,634 | A | * | 10/1979 | King ..................... B60T 8/1893 188/195 |
| 4,561,827 | A | * | 12/1985 | Beaumont ............ B60T 17/02 192/85.49 |
| 5,342,119 | A | * | 8/1994 | Smith .................. B60T 13/683 303/118.1 |
| 2007/0044551 | A1 | * | 3/2007 | Fogelstrom ......... B60T 17/221 73/121 |
| 2010/0168974 | A1 | * | 7/2010 | Bradley, IV ........ B60T 8/1708 303/5 |
| 2012/0212042 | A1 | * | 8/2012 | Kunz ..................... B60T 1/10 303/2 |
| 2015/0246666 | A1 | * | 9/2015 | Sell ....................... B60T 8/349 303/113.2 |
| 2017/0166180 | A1 | * | 6/2017 | Chang .................. B60T 13/683 |
| 2017/0253223 | A1 | * | 9/2017 | Klik ...................... B60T 13/26 |
| 2019/0217833 | A1 | * | 7/2019 | Michalski ............ B60T 17/00 |
| 2019/0337502 | A1 | * | 11/2019 | Farres .................. B60T 15/027 |
| 2021/0316577 | A1 | * | 10/2021 | Gaillaud ............... F04B 41/06 |
| 2022/0219662 | A1 | * | 7/2022 | Subramanian ......... B60T 7/20 |

OTHER PUBLICATIONS

Service Data, Bendix Double Check Valve (2007).
European Search Report (dated Aug. 2, 2022) for corresponding European App. EP 22 16 1491.

* cited by examiner

BRAKING ARRANGEMENT FOR A VEHICLE

BACKGROUND AND SUMMARY

The present invention is directed to a braking arrangement for a vehicle and, more particularly, to a braking arrangement adapted to effect braking as a function of wheel speed.

Anti-lock brake systems (ABS) are common on many vehicles and mandatory on some vehicles. The ABS quickly cycles the brakes to prevent the vehicle's wheels from locking up. Even in vehicles provided with ABS, it is possible for the ABS to fail to operate properly, such as due to certain electronic failures. Additionally, some vehicles with ABS are unstable in that, e.g., the vehicle's rear wheels may lock up or decelerate rapidly compared to front wheels. Lock up of rear wheels can cause extremely unstable conditions that might result in vehicles spinning around and causing damage to other vehicles on the road. Even when rear wheels do not lock but, rather decelerate much faster than front wheels, this can lead to operation in an unstable region and produce a highly dangerous situation.

In vehicles provided with ABS, certain failures such as electronic failures or sensor failures can result in the vehicle running on back-up modes with no ABS functionality creating, e.g., a risk of rear wheels locking up. As the automotive industry has grown over the decades, the need to provide higher braking force to match the higher speeds at which the vehicles are traveling has increased. Also, as modern vehicles tend to carry heavier loads than in the past, higher braking forces are required. To avoid wheel lock-ups when substantial braking forces are desired, ABS functionality has become increasingly important. When the ABS fails, such as due to, e.g., a minor electronic issue, the damage that can be caused by an accident resulting from wheel lock-up can be more severe due to high speeds and high loads of the vehicle.

While ABS technology has gotten smarter over time, it has not always kept up with the growth of other sub systems. For example, modern ABS often do not function well under all environmental conditions, such as slippery conditions like icy or wet surfaces, or when there is excessive tire wear or improper tire pressure. Even with ABS, these conditions can result in wheel lock up or faster deceleration of rear wheels relative to front wheels, and the possibility of the rear wheels going into an unstable region increases.

It is desirable to provide a braking arrangement that can increase the stability of vehicles with ABS. It is also desirable to provide a braking arrangement that can eliminate early rear wheel lock-up in vehicles where ABS unavailable, such as because it is not provided or due to failure of components of the ABS. It is also desirable to provide a braking arrangement that can control braking pressure as a function of wheel/vehicle speed. It is also desirable to provide a braking arrangement that can control braking pressure as a function of vehicle load.

In accordance with an aspect of the present invention, a braking arrangement for a vehicle comprises a source of compressed air, a drive axle for the vehicle, a brake associated with the drive axle and connected to the source of compressed air by an air line, an operator controlled valve in the air line between the source of compressed air and the brake, a proportioning valve in the air line between the operator controlled valve and the brake, and a compressor driven by the drive axle and having an outlet connected to a control port of the proportioning valve.

In accordance with another aspect of the present invention, a braking arrangement for a vehicle comprises a source of compressed air, a drive shaft for the vehicle, a brake associated with a drive axle of the vehicle and connected to the source of compressed air by an air line, an operator controlled valve in the air line between the source of compressed air and the brake, a proportioning valve in the air line between the operator controlled valve and the brake, and a compressor driven by the drive shaft and having an outlet connected to a control port of the proportioning valve.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
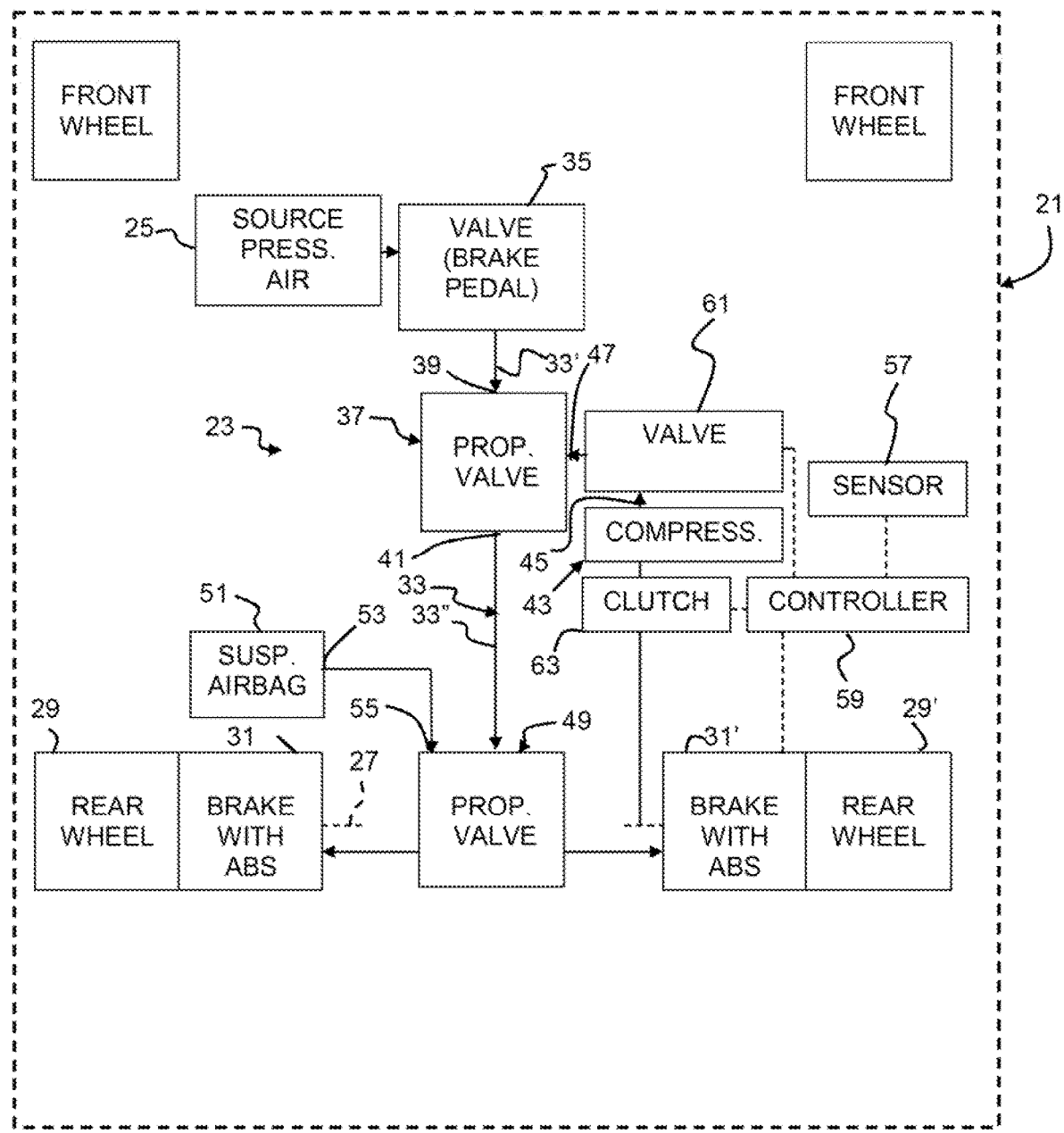
FIG. 1 is a schematic view of a braking arrangement according to a first aspect of the invention.

A vehicle 21 comprising a braking arrangement 23 according to an aspect of the present invention is shown in FIG. 1. The vehicle 21 can be any type of vehicle, however, the present invention is presently believed to have particular applicability to trucks, such as tractors for tractor-trailer combinations.

The braking arrangement 23 comprises a source 25 of compressed air, usually comprising a compressor and/or a compressed air tank. The braking arrangement 23 further comprises a drive axle 27 (shown in phantom) for the vehicle. The braking arrangement 23 is shown as being associated with a rear drive axle 27 associated with a rear wheel 29 of the vehicle, however, while this is presently believed to be a particularly desirable configuration, this is not necessarily the case and the braking arrangement may be associated with a drive axle that is a front axle. In vehicles such as trucks, typically, there are two rear axles, one or both of which are drive axles. In trucks with two drive axles, ordinarily, two drive axles 27, 27' (both in phantom) are provided on opposite sides of a differential (not shown). For purposes of discussion, except where otherwise indicated, the braking arrangement 23 as it relates to the operation of a single drive axle 27 is described, it being understood that the braking arrangement will ordinarily be associated with two (or more) drive axles and that the functioning of the braking arrangement for each drive axle is substantially the same.

The braking arrangement 23 further includes a brake 31 associated with the drive axle 27 and connected to the source 25 of compressed air by an air line 33. The brake 31 is ordinarily pneumatically operated and, ordinarily, greater air pressure in the air line 33 results in greater brake torque. An operator controlled valve 35 is provided in the air line 33 between the source 25 of compressed air and the brake 31. The valve 35 is ordinarily operated by a conventional brake pedal (not shown).

The braking arrangement 23 comprises a proportioning valve 37 in the air line 33 between the operator controlled valve 35 and the brake 31. The proportioning valve 37 includes an inlet port 39 connected to the operator controlled valve by an upstream component 33' of the air line 33, and a delivery port 41 connected to the brake 31 by a downstream component 33" of the air line. A proportioning valve that is well-suited for use as the proportioning valve 37 is a Bendix BP-R1 Bobtail Proportioning Relay Valve, available from Bendix Commercial Vehicle Systems LLC, 901 Cleveland Street, Elyria, Ohio 44035.

A compressor 43 is provided and, in the aspect of the invention shown in FIG. 1, is configured to be driven by the drive axle 27 by a suitable drive (not shown) such as gears or a belt. The compressor 43 has an outlet 45 that is connected to a control port 47 of the proportioning valve 37 (although the outlet of the compressor is not necessarily always in flow communication with the control port). The proportioning valve 37 is configured to restrict flow more when low pressure is supplied to the control port than when higher pressures are supplied to the control port so that less pneumatic pressure and thus less braking force will be supplied to the brakes when the wheels 29 are rotating more slowly (and are thus more likely to lock up) and the compressor 43 is driven by the drive axle 27 more slowly than when the wheels are rotating faster (and are less likely to lock up) and the drive axle drives the compressor faster.

According to an aspect of the invention, the braking arrangement 23 can facilitate minimizing the tendency of the wheel 29 to lock up during braking. When an operator depresses a brake pedal to open the operator controlled valve 35, compressed air is delivered to the brake 31 through the air line 33 and the proportioning valve 37. In the absence of a braking arrangement according to the present invention or a suitable anti-lock braking system (ABS), as pressure in the air line 33 increases, the potential for the wheels 29 locking up increases. With the braking arrangement 23 according to the invention, the compressor 43 delivers pressurized air to the control port 47 of the proportioning valve in a relationship to the speed of the wheels 29 and speed of rotation of the drive axle 27. At higher wheel speeds it is unlikely that the wheels will lock, the compressor 43 is driven faster, and greater pressure is provided to the control port 47 of the proportioning valve 37. This tends to increase flow between the inlet port 39 and the delivery port 41 of the proportioning valve 37 and tends to increase opening of the proportioning valve so that more pressure from the source of compressed air 25 is supplied to the brake 31. At lower wheel speeds, where the danger of the wheels going from a low speed to zero speed, i.e. locking up, is greater than at high wheel speeds, the compressor 43 is driven at a slower rate than at high speeds, and less (or no) pressure is supplied to the control port 47 of the proportioning valve 37 than at higher speeds. Consequently, there is more restriction of flow between the inlet port 39 and the delivery port 41 of the proportioning valve 37 so that the brake 31 can receive less of the pressure available to be supplied through the proportioning valve from the source 25 of compressed air and through the operator controlled valve 35 via the air line 33 and the wheels, already moving at a low speed, will have less of a tendency to switch from the low wheel speed to lock up.

In addition to reducing risk of the wheel 29 locking up as a function of speed, the braking arrangement 23 can facilitate reducing risk of the wheel locking up as a function of vehicle load. When the vehicle 21 is more heavily loaded, it requires more braking force to slow or stop the vehicle than at lower loads. To reduce the tendency of the high pressures supplied to the brake 31 associated with large braking force for the vehicle 21, a second proportioning valve 49 can be provided in the air line 33, and a suspension airbag 51 having an outlet 53 connected to a control port 55 of the second proportioning valve can supply pressure to the control port of the second proportioning valve as a function of vehicle load. At higher vehicle loads, more braking torque is needed to stop the vehicle. At higher vehicle loads, more pressure is delivered from the suspension airbag 51 to the control port 55 of the second proportioning valve 49 and there is less restriction in the second proportioning valve 49 so that high pressures in the air line 33 upstream of the second proportioning valve will be delivered to the brake 31. At lower vehicle 21 loads, less pressure is delivered from the suspension airbag 51 to the control port 55 of the second proportioning valve 49 and there is more restriction in the second proportioning valve so that a smaller fraction of the air pressure in the air line upstream of the second proportioning valve is supplied to the brake 31. In FIG. 1, the second proportioning valve 49 is illustrated as being disposed downstream of the first proportioning valve 37 with the output of the first proportioning valve being connected to the input of the second proportioning valve, however, the second proportioning valve can, alternatively, be disposed upstream of the first proportioning valve with the output of the second proportioning valve being connected to the input of the first proportioning valve.

The braking arrangement 23 will typically include one or more sensors 57 that will detect circumstances that call for operation of the compressor 43 to effect braking as a function of the speed of the wheels according to the invention. For example, the braking arrangement 23 is particularly useful in the event of failure or improper operation of an antilock brake system (ABS) associated with the brake 31. Means such as sensor(s) 57 associated with ABS components (such as a fault signal from an ABS electronic control unit) or sensors that detect locking of a wheel can be provided for determining whether the ABS is operating properly and are adapted to send a signal to a controller 59 (or, as the case may be, not send a signal to the controller when one is ordinarily sent, which will be understood to mean the same thing as sending a signal to a controller when one is ordinarily not sent). Certain signals from one or more sensors may trigger the controller 59 to control braking arrangement 23 components to effect braking as a function of the speed of the wheels according to the invention.

Figure 2:
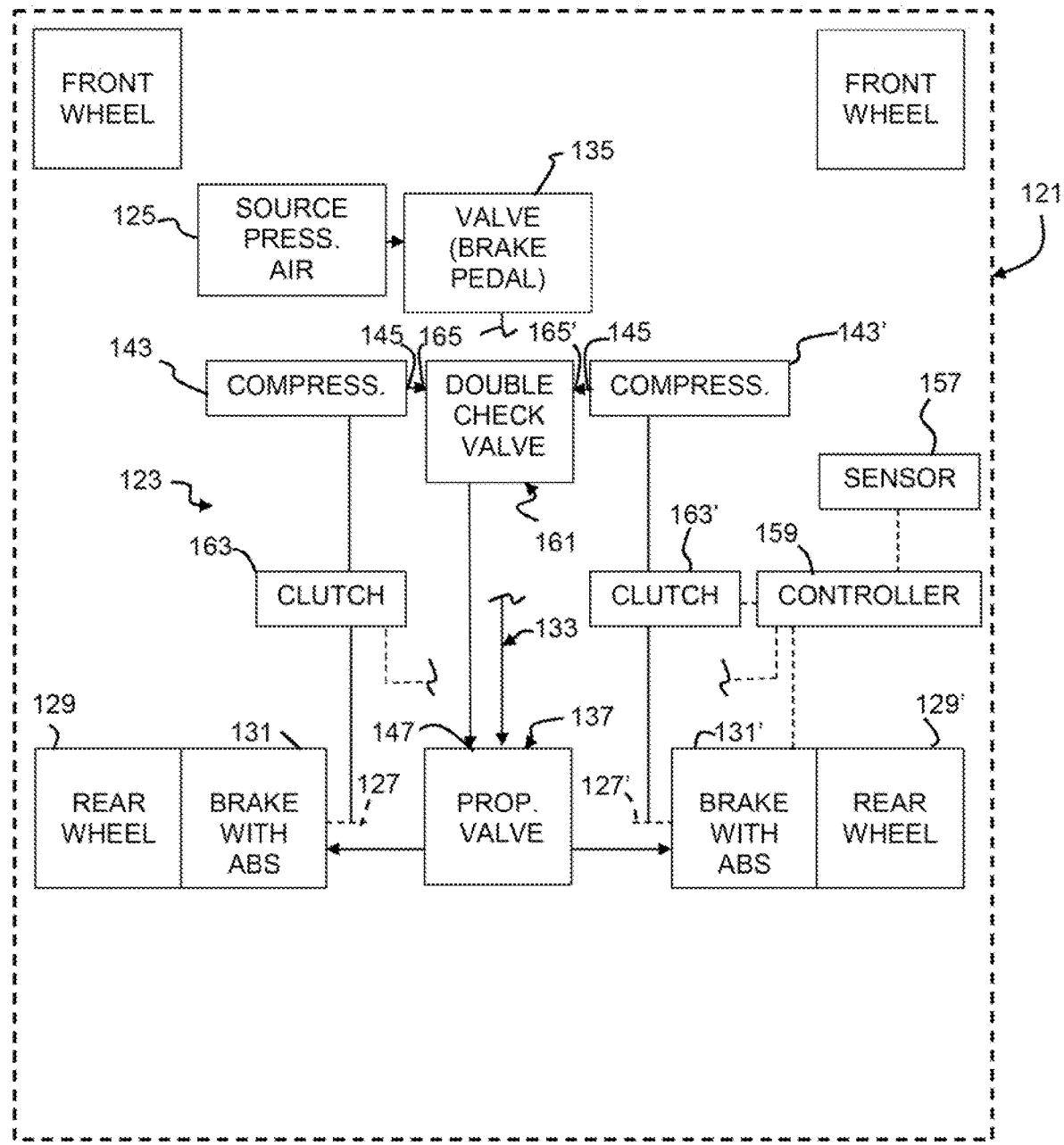
FIG. 2 is a schematic view of a braking arrangement according to a second aspect of the invention.
Figure 3:
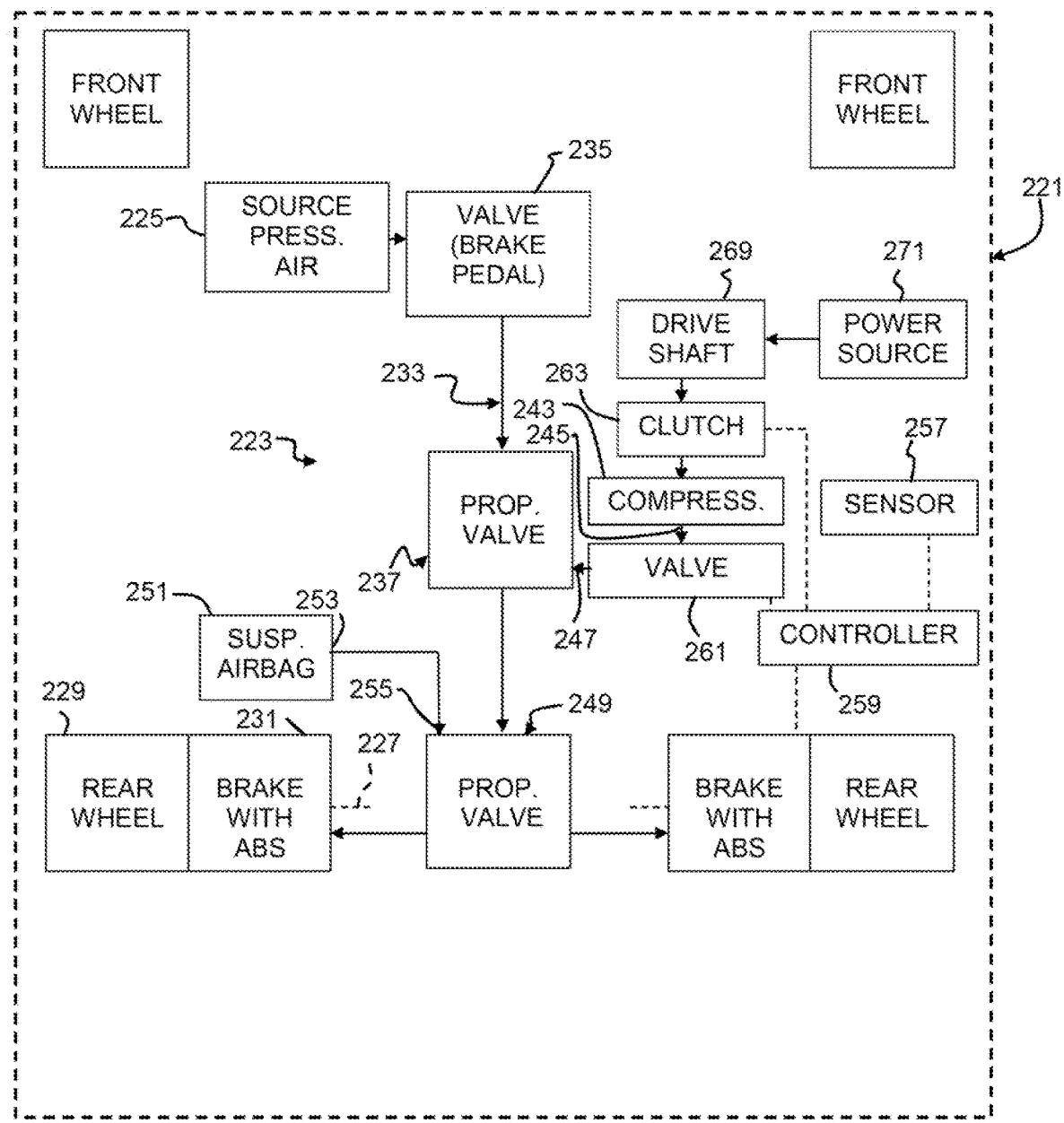
FIG. 3 is a schematic view of a braking arrangement according to a third aspect of the invention.

In addition to or instead of sensor(s) 57 for determining whether a vehicle's ABS is operating correctly, means such as sensors 57 can be provided for assessing environment conditions and sending a signal to the controller 59. Environment conditions that might be sensed to determine the desirability of effecting braking as a function of the speed of the wheels according to the invention include adverse conditions that can cause wheel locking during braking, such as slippery driving surfaces such as might occur on wet or icy roads. While FIGS. 1-3 illustrate brake with ABS. ABS is not necessary to the present invention and, if a vehicle 21 is not provided with ABS, then sensor(s) for detecting extreme brake demand such that there is an increased possibility of wheel locking might provide one or more signals to the controller to effect braking as a function of the speed of the wheels according to the invention.

For purposes of discussion, except where otherwise indicated, the sensors 57 and controller 59 will be described in connection with sensing whether the vehicle's ABS is operating correctly and, in response to detection of improper ABS operation, effecting braking as a function of the speed of the wheels according to the invention. Except where otherwise indicated, it shall be understood that the discussion is equally applicable to operation of the braking arrangement 23 where signals from other types of sensors (such as sensors that sense environment conditions or wheel locking) are sent to the controller 59.

The controller 59 can be configured to start operation of the compressor 43 upon receipt of a signal such as that the ABS is not operating properly. Alternatively, the compressor 43 can operate at all times and merely not be connected to the proportioning valve 37. For example, the braking arrangement 23 can comprise a controlled valve 61 disposed between the outlet of the compressor 41 and the control port 47 of the proportioning valve 37. The controller 59 can be configured to open the controlled valve 61 upon receipt of a signal such as that the ABS is not operating properly. Such a controlled valve 61 and a controller 59 configured to open the controlled valve such as when the ABS is not operating properly may, however, also be provided even if the compressor 43 does not operate at all times. In this way, the outlet 45 of the compressor 43 can be caused to be in flow communication with or stopped from flow communication with the control port 47 of the proportioning valve 37 as required to effect braking as a function of wheel speed according to the invention.

The braking arrangement 23 can comprise a clutch 63 between the drive axle 27 and the compressor 43. The clutch 63 can be controlled by the controller 59 to close and thereby commence operation of the compressor upon receipt of a signal from a sensor 57, such as that the ABS is not operating properly. The clutch 63 and a controlled valve 61 may be provided in combination and controlled by the controller 59.

The compressor 43 may be but is not necessarily controlled by the controller 59 so that the compressor is not operated upon receipt of a signal that the ABS is operating properly. This will ordinarily be accomplished by opening the clutch 63 or otherwise disengaging the drive axle 27 and the compressor 43 by the controller 59 so that the compressor is not operated upon receipt of a signal that the ABS is operating properly. In this way, energy is not wasted by driving the compressor at all times, and the life of the compressor may be extended.

The vehicle 21 of FIG. 1 can include, associated with one drive axle 27, a compressor 43, a proportioning valve 37 in an air line 33 between the operator controlled valve 35 and the brake 31. Another drive axle 27' may have associated with it a second compressor (not shown) and another proportioning valve (not shown) in an air line (not shown) between the operator controlled valve 35 and the wheel 29' and the brake 31' associated with that drive axle. Alternatively, as seen in FIG. 2, the vehicle 121 can include, as in the embodiment of FIG. 1, a braking arrangement 123 including a first drive axle 127 (and wheel 129) associated with a compressor 143, and a first brake 131 connected to a source of compressed air 125 via an air line 133 in which an operator controlled valve 135 and a proportioning valve 137 are provided, with an outlet 145 of the compressor being connected to a control pot 147 of the proportioning valve. A second drive axle 127' (and wheel 129') associated with a second compressor 143' may also be provided, along with a second brake 131' connected to the source of compressed air 125 via the air line 133 in which the operator controlled valve 135 and the proportioning valve 137 are provided, with an outlet 145' of the second compressor being connected to the control port 147 of the proportioning valve. Again, the outlets 145, 145' of the compressors 143, 143' are not necessarily always in flow communication with the control port 147 of the proportioning valve.

The embodiment of FIG. 2 does not include a separate proportioning valve but, instead, comprises a double check valve 161 having inlets 165 and 165' connected to the outlet 145 of the compressor 143 and to the outlet 145' of the second compressor 143', respectively, and an outlet 167 connected to a single proportioning valve 137. The double check valve 161 is configured to direct a flow of air to the proportioning valve 137 from whichever of the compressor 143 and the second compressor 143' delivers a higher pressure to the double check valve. A double check valve that is well-suited for use as such a double check valve 161 is the Bendix Double Check Valve, available from Bendix Commercial Vehicle Systems LLC, 901 Cleveland Street, Elyria, Ohio 44035.

As with the embodiment described in connection with FIG. 1, the braking arrangement 123 can include a second proportioning valve (not shown) in the air line 133, and a suspension airbag (not shown) having an outlet connected to a control port of the second proportioning valve so that, in addition to effecting braking as a function of the speed of the wheels, braking can be effected as a function of the vehicle load. Similarly, whether the compressors 143, 143' supply pressurized air to the control port 147 of the proportioning valve 137 can be controlled by a controller 159 that can, in response to signals from one or more sensors 157 suggesting, e.g., potential for wheel locking, control closing and opening of a controlled valve (not shown in FIG. 2) like the controlled valve 61 discussed in connection with FIG. 1 to prevent or permit pressurized gas from the compressor to be provided to the control port of the proportioning valve, and/or by closing or opening clutches 163, 163' between the drive axles 127, 127' and their respective compressors 143, 143' to start or stop operation of the compressors.

FIG. 3 shows a braking arrangement 223 for a vehicle 221 according to another aspect of the present invention. The braking arrangement 223 includes a source 225 of compressed air, a brake 231 associated with a drive axle 227 (and wheel 229) of the vehicle 221 and connected to the source of compressed air by an air line 233, an operator controlled valve 235 in the air line between the source of compressed air and the brake, and a proportioning valve 237 in the air line between the operator controlled valve and the brake.

The braking arrangement 223 comprises a drive shaft 269 (sometimes referred to as a propeller shaft or tailshaft) for the vehicle 221 and a compressor 243 driven by the drive shaft and having an outlet 245 connected to a control port 247 of the proportioning valve (again, the outlet of the compressor is not necessarily always in flow communication with the control port). The drive shaft 269 is typically connected at one end to a power source 271 such as an internal combustion engine or an electric motor and, at an opposite end, to means such as a differential (not shown) for driving the vehicle's wheels 229. As with the braking arrangements 23 and 123, the braking arrangement 223 facilitates effecting braking as a function of the speed of the wheels according to the invention as the faster the drive shaft 269 turns (and the faster the vehicle moves), the faster the compressor 243 is driven and the greater the pressure that can be provided at the control port 247 of the proportioning valve 237 to limit flow from the source 225 of compressed air to the brake 231 through the proportioning valve 235.

As with all embodiments of the braking arrangement described herein, the braking arrangement 223 can include a second proportioning valve 249 in the air line 233, and a suspension airbag 251 having an outlet 253 connected to a control port 255 of the second proportioning valve so that, in addition to effecting braking as a function of the speed of the wheels, braking can be effected as a function of the vehicle load.

Similarly, whether the compressor 243 supplies pressurized air to the control port 247 of the proportioning valve 237 can be controlled by a controller 259 that can, in response to signals from one or more sensors 257 suggesting, e.g., potential for wheel locking, control closing and opening of a controlled valve 261 to prevent or permit pressurized gas from the compressor to be provided to the control port of the proportioning valve, and/or by closing or opening a clutch 263 between the drive axles 227 and the compressors 243 to start or stop operation of the compressors. For example, the braking arrangement 223 may include an antilock brake system (ABS) associated with the brake 231, means, such as sensors 257, for determining whether the ABS is operating properly and adapted to send a signal to the controller 259 that is configured to start operation of the compressor, such as by closing the clutch 263, upon receipt of a signal that the ABS is not operating properly. Alternatively or in addition to the clutch 263, the braking arrangement 223 can include the controlled valve 261 disposed between the outlet 245 of the compressor 243 and the control port 247 of the proportioning valve 237, the controller being configured to open the controlled valve upon receipt of a signal that the ABS is not operating properly.

Separate proportioning valves (not shown) associated with separate compressors associated with each drive axle of the vehicle 221 can be provided, or, as shown in FIG. 2, compressors associated with each drive axle can be connected to a double check valve (not shown) connected between the compressors and a single proportioning valve. The double check valve can be provided upstream or downstream of any controlled valve 261 that is provided.

The invention can provide a partial contribution to minimizing danger of wheel lock-up or faster deceleration of rear brakes relative to front wheels in vehicles with or without ABS. The contribution is partial in the sense that it does not necessarily prevent rear wheels from locking up but can delay rear wheel from locking up until wheel speed has reduced. Aspects of the present invention can be helpful in increasing the stability of vehicles with ABS. By aspects of the present invention, stopping distances can be reduced with less risk of early rear wheel lock-up in vehicles, even where ABS unavailable due to, e.g., electronic failures.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A braking arrangement for a vehicle, comprising:
a source of compressed air;
a drive axle for the vehicle;
a brake associated with the drive axle and connected to the source of compressed air by an air line;
an operator controlled valve in the air line between the source of compressed air and the brake;
a proportioning valve in the air line between the operator controlled valve and the brake;
a compressor driven by the drive axle and having an outlet connected to a control port of the proportioning valve;
a compressor driven by the drive axle and having an outlet connected to a control port of the proportioning valve;
an antilock brake system (ABS) associated with the brake;
a controller, and
means for determining whether the ABS is operating properly and adapted to send a signal to the controller, the controller being configured to start operation of the compressor upon receipt of the signal that the ABS is not operating properly.

2. The braking arrangement for the vehicle as set forth in claim 1, comprising a second proportioning valve in the air line, and a suspension airbag having an outlet connected to a control port of the second proportioning valve.

3. The braking arrangement for the vehicle as set forth in claim 2, wherein the second proportioning valve is disposed between the proportioning valve and the brake.

4. The braking arrangement for the vehicle as set forth in claim 1, further comprising a controlled valve disposed between the outlet of the compressor and the control port of the proportioning valve, the controller being configured to open the controlled valve upon the receipt of the signal that the ABS is not operating properly.

5. The braking arrangement for the vehicle as set forth in claim 1, comprising a clutch between the drive axle and the compressor and controlled by the controller to close and thereby start the operation of the compressor upon the receipt of the signal that the ABS is not operating properly.

6. The braking arrangement for the vehicle as set forth in claim 5, wherein the compressor is controlled by the controller so that the compressor is not operated upon the receipt of a signal that the ABS is operating properly.

7. The braking arrangement for the vehicle as set forth in claim 1, comprising a clutch between the drive axle and the compressor and controlled by the controller to open so that the compressor is not operated upon receipt of a signal that the ABS is operating properly.

8. The braking arrangement for the vehicle as set forth in claim 1, further comprising a controlled valve disposed between the outlet of the compressor and the control port of the proportioning valve.

9. The braking arrangement for the vehicle as set forth in claim 1, comprising a second drive axle for the vehicle, a second brake associated with the second drive axle and connected to the source of compressed air by the air line, and a second compressor driven by the second drive axle and having an outlet connected to the control port of the proportioning valve.

10. A braking arrangement for a vehicle, comprising:
a source of compressed air;
a drive axle for the vehicle;
a brake associated with the drive axle and connected to the source of compressed air by an air line;
an operator controlled valve in the air line between the source of compressed air and the brake;
a proportioning valve in the air line between the operator controlled valve and the brake:
a compressor driven by the drive axle and having an outlet connected to a control port of the proportioning valve;
a controller; and
means for assessing environment conditions and adapted to send a signal to the controller, the controller being configured to start operation of the compressor upon receipt of a signal that one or more adverse environmental conditions are present.

11. The braking arrangement for the vehicle as set forth in claim 10, comprising a clutch between the drive axle and the compressor and controlled by the controller to close and thereby start the operation of the compressor upon the receipt of the signal that the one or more adverse environmental conditions are present.

12. The braking arrangement for the vehicle as set forth in claim 11, wherein the compressor is controlled by the controller so that the compressor is not operated upon receipt of a signal that the one or more adverse environmental conditions are not present.

13. The braking arrangement for the vehicle as set forth in claim 10, comprising a clutch between the drive axle and the compressor and controlled by the controller to open so that the compressor is not operated upon receipt of a signal that one or more adverse environmental conditions are not present.

14. A braking arrangement for a vehicle, comprising:
a source of compressed air;
a drive axle for the vehicle;
a brake associated with the drive axle and connected to the source of compressed air by an air line;
an operator controlled valve in the air line between the source of compressed air and the brake;
a proportioning valve in the air line between the operator controlled valve and the brake:
a compressor driven by the drive axle and having an outlet connected to a control port of the proportioning valve;
a second drive axle for the vehicle;
a second brake associated with the second drive axle and connected to the source of compressed air by the air line;
a second compressor driven by the second drive axle and having an outlet connected to the control port of the proportioning valve; and
a double check valve having inlets connected to the outlet of the compressor and to the outlet of the second compressor and an outlet connected to the proportioning valve.

15. The braking arrangement for the vehicle as set forth in claim 14, wherein the double check valve is configured to direct a flow of air to the proportioning valve from whichever of the compressor and the second compressor delivers a higher pressure to the double check valve.

16. A braking arrangement for a vehicle, comprising:
a source of compressed air;
a drive shaft for the vehicle;
a brake associated with a drive axle of the vehicle and connected to the source of compressed air by an air line;
an operator controlled valve in the air line between the source of compressed air and the brake;
a proportioning valve in the air line between the operator controlled valve and the brake;
a compressor driven by the drive shaft and having an outlet connected to a control port of the proportioning valve;
an antilock brake system (ABS) associated with the brake;
a controller, and
means for determining whether the ABS is operating properly and adapted to send a signal to the controller, the controller being configured to start operation of the compressor upon receipt of the signal that the ABS is not operating properly.

17. The braking arrangement for the vehicle as set forth in claim 16, comprising a second proportioning valve in the air line, and a suspension airbag having an outlet connected to a control port of the second proportioning valve.

18. A braking arrangement for a vehicle, comprising:
a source of compressed air;
a drive shaft for the vehicle;
a brake associated with a drive axle of the vehicle and connected to the source of compressed air by an air line;
an operator controlled valve in the air line between the source of compressed air and the brake;
a proportioning valve in the air line between the operator controlled valve and the brake; and
a compressor driven by the drive shaft and having an outlet connected to a control port of the proportioning valve;
an antilock brake system (ABS) associated with the brake;
a controller;
means for determining whether the ABS is operating properly and adapted to send a signal to the controller, and
a controlled valve disposed between the outlet of the compressor and the control port of the proportioning valve, the controller being configured to open the controlled valve upon receipt of a signal that the ABS is not operating properly.

\* \* \* \* \*